US 8,780,921 B2

(12) United States Patent
Cann

(10) Patent No.: US 8,780,921 B2
(45) Date of Patent: Jul. 15, 2014

(54) SECURE PROCEDURE FOR ACCESSING A NETWORK AND NETWORK THUS PROTECTED

(75) Inventor: Yannick Cann, Paris (FR)

(73) Assignee: Sagem Defense Securite, Paris (FR)

( * ) Notice: Subject to any disclaimer, the term of this patent is extended or adjusted under 35 U.S.C. 154(b) by 71 days.

(21) Appl. No.: 13/575,443

(22) PCT Filed: Jan. 26, 2011

(86) PCT No.: PCT/EP2011/051031
§ 371 (c)(1),
(2), (4) Date: Oct. 8, 2012

(87) PCT Pub. No.: WO2011/092183
PCT Pub. Date: Aug. 4, 2011

(65) Prior Publication Data
US 2013/0044633 A1 Feb. 21, 2013

(30) Foreign Application Priority Data
Jan. 26, 2010 (FR) ...................................... 10 50513

(51) Int. Cl.
H04L 12/28 (2006.01)
(52) U.S. Cl.
USPC ........ 370/395.2; 370/230; 370/235; 709/227; 709/228
(58) Field of Classification Search
None
See application file for complete search history.

(56) References Cited

U.S. PATENT DOCUMENTS

| 5,805,803 | A | 9/1998 | Birrell et al. |
| 8,099,495 | B2* | 1/2012 | Sood et al. .................... 709/225 |
| 8,238,811 | B2* | 8/2012 | Lydon ........................... 455/3.03 |
| 2004/0049702 | A1 | 3/2004 | Subramaniam et al. |
| 2005/0005133 | A1* | 1/2005 | Xia et al. ...................... 713/185 |
| 2007/0127430 | A1 | 6/2007 | Maeng |
| 2008/0192739 | A1* | 8/2008 | Carrasco ........................ 370/389 |
| 2009/0307751 | A1* | 12/2009 | Lin et al. ............................. 726/3 |

OTHER PUBLICATIONS

International Search Report for PCT/EP2011/051031, dated May 6, 2011.
Written Opinion for PCT/EP2011/051031, dated May 6, 2011.
Security Task Group IEEE, "Draft Standard for Local and Metropolitan Area Networks—Port Based Network Access Control", Oct. 2, 2009 (Whole Document).
Kaafar et al, "A Kerberos-Based Authentication Architecture for Wireless LANs", *Networking Technologies*, Apr. 8, 2004, pp. 1344-1.

* cited by examiner

*Primary Examiner* — Donald Mills
(74) *Attorney, Agent, or Firm* — Nixon & Vanderhye PC

(57) ABSTRACT

The description is of a procedure that allows temporary secure access to a communication network. The network has a number of network connection ports. Certain of these ports are termed confidential, that is, their access is controlled by the network operator, in contrast to the other connection ports access to which is free. The access procedure claims is based on the provision of two distinct services accessible via tunnels that are, advantageously, digital. The first service is accessible only from the confidential connection ports and only allows a connection credit to be obtained. The second service is accessible from all connection ports, only by means of the connection credit issued by the first service.

11 Claims, 4 Drawing Sheets

SECURE PROCEDURE FOR ACCESSING A NETWORK AND NETWORK THUS PROTECTED

This application is the U.S. national phase of International Application No. PCT/EP2011/051031 filed 26 Jan. 2011 which designated the U.S. and claims priority to FR Patent Application No. 10/50513 filed 26 Jan. 2010, the entire contents of each of which are hereby incorporated by reference.

FIELD OF THE INVENTION

The present invention concerns the field of safety of access to communication networks. More specifically, it relates to a procedure that allows temporary safe access to a communication network.

BACKGROUND OF THE INVENTION

Modern communication networks are currently found almost everywhere, both in domestic and in business locations. These networks allow the implementation of safety procedures allowing connection only to duly authenticated persons. These access procedures are generally based on allocation of connection credits to persons required to connect. These connection credits are then verified during connection procedures. These procedures are known to specialists in the field by the acronym "AAA" (Authentication, Authorisation and Accounting). The process involves authorising an authenticated person to connect and be able to report on the authorisations thus granted. The connection credits thus granted are typically combinations of connection name and password, or cryptographic certificates or any other means of user identification. These procedures are well known and their liability is proven.

However, these connection credits and the process of allocating and managing them are often difficult to implement. Implementation is justified for regular users of a secure network, but can be cumbersome for occasional users of a communication network.

SUMMARY OF THE INVENTION

The invention is aimed at resolving the previous problems via a process of secure access to a communication network. The network has ports for connecting to the network. Some of these ports are termed "confidential", that is, their access is controlled by the network operator, in contrast to the other connection ports, which have free access. The access procedure claimed is based on the offer of two distinct services accessible via favourably figured tunnels. The first service is accessible from confidential connection ports only and only allows a connection credit to be obtained. The second service is accessible from all connection ports, using only the connection credit issued by the first service.

The invention allows an occasional user to obtain a connection credit in a controlled way through a confidential connection port. The user can subsequently use this connection credit to access the network at any point. It is therefore possible, for example, to distribute temporary connection credits to visitors when they enter a business premises. The visitor can then use these credits in any meeting room of the business.

The invention concerns a process for accessing a data network via a terminal that comprises a stage of connection from the terminal to a connection port on the specific network identified as a confidential port; a stage of establishing a tunnel to a first service known as a configuration service, the said configuration service being accessible only through the said confidential connection ports; a stage of obtaining a connection credit from the said configuration service; a stage of connecting the terminal to any connection port on the network, and a stage of establishing a tunnel to a second service known as an operational service, using the credit connection obtained from the configuration service.

According to one specific method of realising the invention, the connection credits provided by the configuration service being limited in time, the stage of establishing a tunnel to the operational service comprises a stage of verifying the validity of the credit.

According to one specific method of realising the invention, the process also includes a stage of closing the port to which the terminal is connected when a given number of unsuccessful attempts during the establishment of a tunnel to the service is operational.

According to one specific method of realising the invention, the process also includes a stage of opening the free connection ports when a connection credit is issued by the configuration service and a stage of closing the free connection ports when no unused connection credit is available.

According to one specific method of realising the invention, the process also includes a stage of opening the free connection ports when a terminal is disconnected from a port while it has a connection credit that is still valid.

According to one specific method of realising the invention, the process also includes a stage of periodic surveillance of the periods of validity of unused connection credits and a stage of closing the free connection ports when all the unused connection credits cease to be valid.

According to one specific method of realising the invention, the process also includes a stage of closing the port to which a terminal is connected if a tunnel to one of the services is not completed after a given time.

According to one specific method of realising the invention, the process also includes a stage of obtaining a set of software tools from the configuration service, the stage of establishing the tunnel to the operational service then being managed by this set of software tools.

According to one specific method of realising the invention, the process also includes a stage of periodic examination of the validity of the connection credit by the set of software tools and a stage of deletion of the connection credit and the set of software tools when this connection credit ceases to be valid.

According to one specific method of realising the invention, the stages of closing the connection port contain a stage of physical closure of the said port using a device that allows physical interruption of the connection to the said connection port.

The invention also concerns a data network including means of access for a terminal containing a set of connection ports for the network, including at least one specific port identified as a confidential port; means of producing a tunnel to a first service known as the configuration service, the said configuration service being accessible only to the said confidential connection ports; means of issuing a connection credit via the said configuration service, and means of establishing a tunnel to a second service termed the operational service using the connection credit obtained from the configuration service.

BRIEF DESCRIPTION OF THE DRAWINGS

The characteristics of the invention mentioned above, together with others, will be made more clear by a reading of the following description of an example of realisation, the said description being given in relation to the attached sketches, in which.

DETAILED DESCRIPTION OF THE INVENTION

Figure 1:
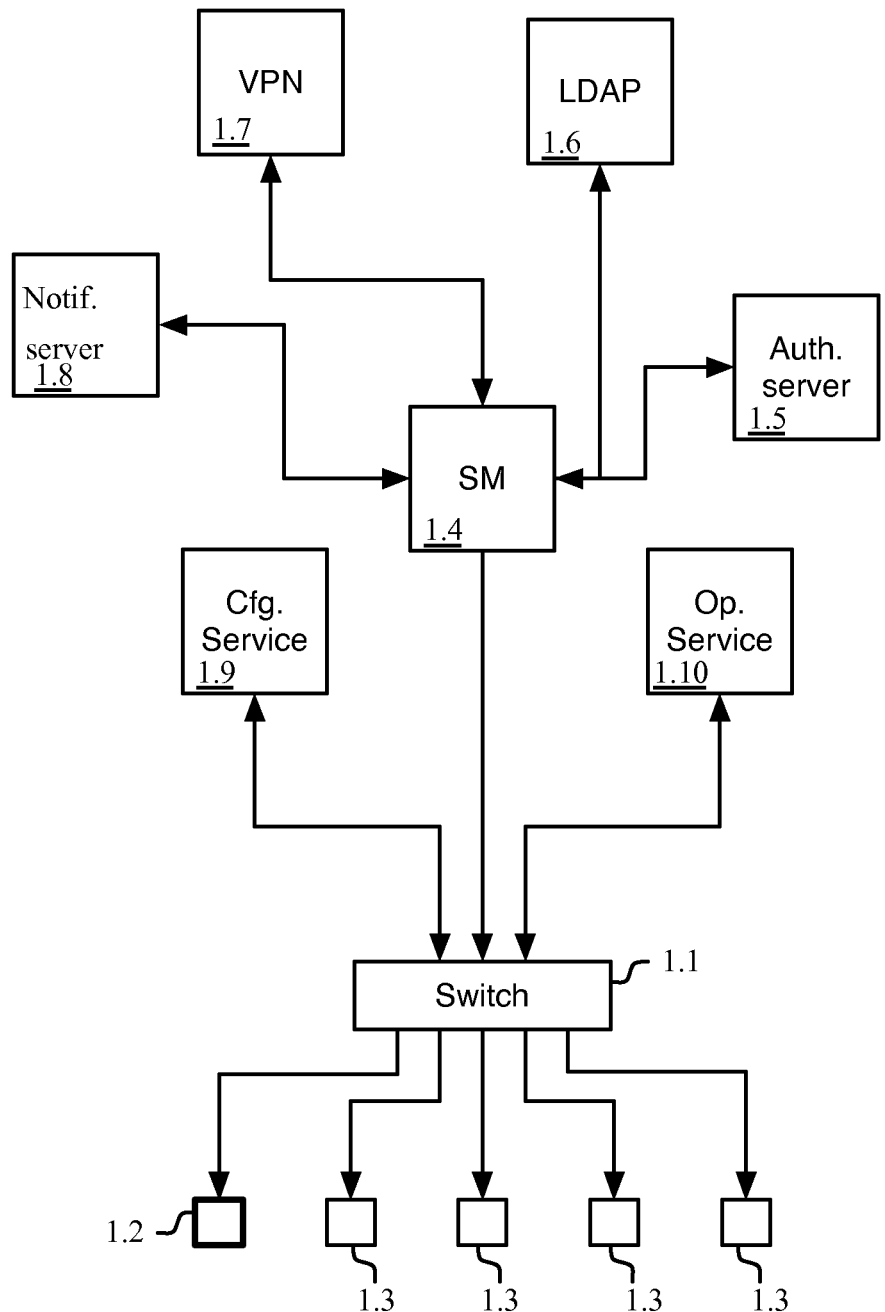
FIG. 1 illustrates the system architecture according to the example of realising the invention.

FIG. 1 illustrates the system architecture according to the example of realising the invention. The heart of the invention is based on a routing gateway or switch 1.1, which allows access to the network. This switch is equipped with a traffic filter or firewall that allows the introduction of an access policy that limits the possibilities on offer to a terminal that has just connected on its ports 1.2 and 1.3. In order to simplify the description, we refer simply to a switch. In an actual case, this switch is generally implemented in the form of a network of switches functioning according to the principle of that described here in order to adapt to the size of the network for which access is to be made secure according to the invention.

This switch allows a set of connection ports 1.2, 1.3 to be served. Typically, according to the example of realisation, these connection ports are Ethernet-standard plugs known as ISO/IEC 8802-3. The invention is not limited to this type of connection, it can be used on any network transport layer, and in particular it is possible to secure wireless access points, such as Wi-Fi points, in the same way.

We define in this document the term network connecting port as the physical interface allowing a terminal to connect on a network. This interface may be making Ethernet for example. It can also be a wireless access point for a wireless connection, for example WiFi. It is not a port as defined in TCP/IP allowing, associated with an IP address, to establish a communication session over a physical connection already established.

Among the connection ports served by the switch 1.1, certain ports are identified as being confidential. This is port 1.2 in the sketch. Physically, there is nothing to distinguish these confidential connection ports. It is assumed that access to these ports is made secure, or at least controlled, by the network operator. The method of applying this control is outside the scope of the present invention. It may relate to ports positioned in a zone controlled by a person, for example on the business home page or in the offices of a person responsible for managing network access. The other connection ports, bearing the reference 1.3 on FIG. 1, are assumed to have free access for the system user. These are typically network connection ports available in the meeting rooms of the business. The location of the confidential connection ports and the free access connection ports will depend on the context in which the invention is used.

However, the management of these ports via the switch differs. Management is conducted through the control of a module known as a switch manager 1.4. This module is able to open and close the various connection ports linked to the switch. It is also able to question the state of the connection ports and in particular find out whether a terminal is connected to the port or whether the port is free.

To manage access and control the opening and closing of the ports, the switch manager co-operates with an authentication server 1.5, which manages authentication and access authorisations. It also co-operates with a user location server 1.6, typically of the LDAP type, which registers the connection credits granted and various items of information relating to each credit granted. It also co-operates with a secure tunnel server 1.7 or VPN (Virtual Private Network), which manages digital communications between the terminal, which connects to one of the ports, and the network services. It also co-operates with a notification server 1.8 to generate notifications, especially alerts, when certain events become apparent.

The system offers two services to terminals connected to the network via the switch. The first service 1.9 is termed the configuration service. This service is the service that allows an unknown terminal that has connected to obtain a connection credit to access the network. This connection credit issue process is the sole function of this service The second service 1.10, termed the operational service, is the service that provides the general functions of the network. This is the service for which access is sought and made subject to the provision of a connection credit distributed via the configuration service.

The switch is configured so as to authorise only the routing of data corresponding to a digitised tunnel between a terminal and the tunnel server 1.7. According to the example of realising the invention, the tunnel server is a server that follows the PPPoE (Point to Point Protocol over Ethernet) protocol described in RFC 2516. Other digitised tunnels can be used, such as the PPTP (Point to Point Tunnel Protocol) from Microsoft, the L2TP (Layer 2 Tunnelling Protocol) or other situations using a secure version of the IP protocol or IPsec (Internet Protocol Security, RFC 2401). Some of these technologies may be combined, such as PPPoE and IPSEC. The operational service is accessible provided there is a valid connection credit from all the connection ports, confidential ports and free access ports, from the switch. This is in contrast to the configuration service, which is accessible only from a connection on a confidential port.

Figure 2:
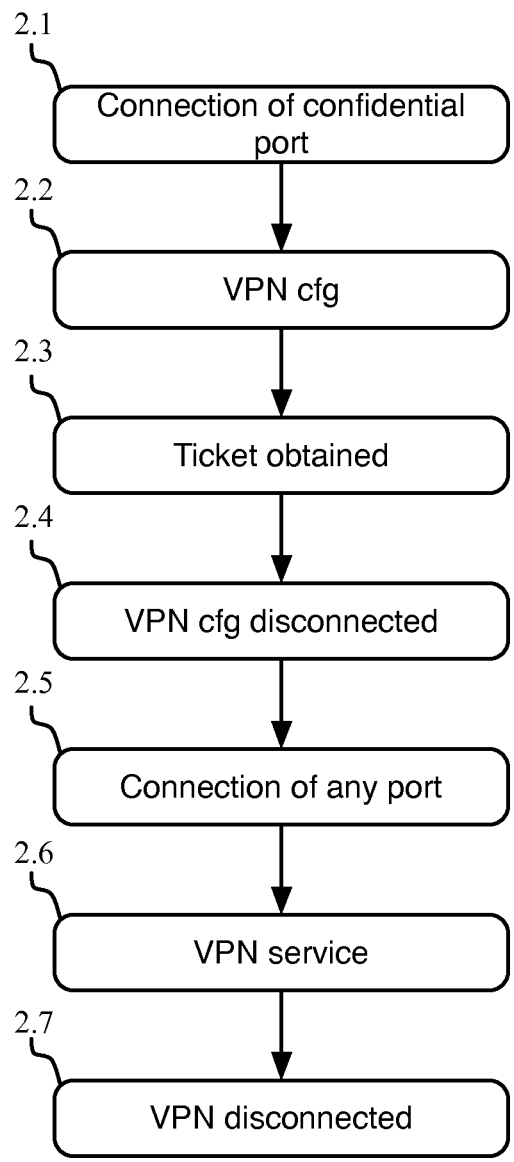
FIG. 2 describes the main stages in the process of connection to the network, according to the example of realising the invention.

FIG. 2 describes the main stages in the process of connecting to the network according to the invention. A user is presented with a terminal for connecting to the network. If the user has no connection credit, connection to a free access port is not possible. In fact, these ports allow access only to the operational service, and in order to do that, require possession of a connection credit. The user must therefore connect to a confidential port during a stage 2.1. From this confidential port, the configuration service is also accessible. To access it, a digital tunnel for accessing the service must be configured. Advantageously, the creation of this digital tunnel requires a connection credit that may, for example, be a connection name and a password. This connection credit is less sensitive than the one providing access to the operational service. According to the example of realisation, this is an identification code and single password that constitute a secret shared between the users' terminals and the system. By means of this connection credit, during a stage 2.2, the terminal creates the VPN tunnel with the configuration service.

Advantageously, this configuration service is isolated on the network and malicious use of the connection to the configuration service cannot allow fraudulent access to resources other than the configuration service.

During stage 2.3, the terminal identifies itself with the configuration service and obtains a connection credit, also known as a ticket, for the operational service. An entry in the directory service, here known as LDAP, is then created or updated if it already exists, for the terminal. This directory service memorises the terminal identity and the associated information, such as time of connection and the connection credit issued. In this example of realising the invention, the connection credit consists of a connection name corresponding to the address of the network terminal card or MAC (Media Access Control) address. The password is a random series of characters generated on demand. This connection credit may take any form other than a connection name and password pair. In particular, it may be a cryptographic connection certificate.

The terminal then closes the digital tunnel produced with the configuration service at stage 2.4. The terminal therefore has a connection credit that now allows it to access the operational service. This connection credit is then useable through the use of any connection port within the switch, be this a confidential port or a free access port.

During stage 2.5, the terminal once again connects physically to one of the connection ports within the switch.

During stage 2.6, it establishes a digital tunnel to the operational service using the connection credit previously received from the configuration service. It can then use the network resources placed at its disposal via this operational service.

At the end of the user session, the terminal closes the digital tunnel to the operational service and disconnects itself from the port used. This is stage 2.7.

This scheme for accessing the communication network makes its access secure, through minimisation of management and control operations needed for managing the credit connections. In fact, the connection credit is obtained securely from certain clearly identified connection ports. Next, the user holding the connection credit is free to access the network from any access point whatsoever. He is then recognised and obtains access to the network. Conversely, a terminal that has not obtained a connection credit will be prohibited from accessing the operational network through the free access ports. As these ports cannot provide access to the configuration service, the only possible source of valid connection credits, it is not possible to force fraudulent connection and unauthorised access to the operational network. The use of digital tunnels allows limitation of possible attacks from the switch to the layer 2 or the contact layer.

Figure 3:
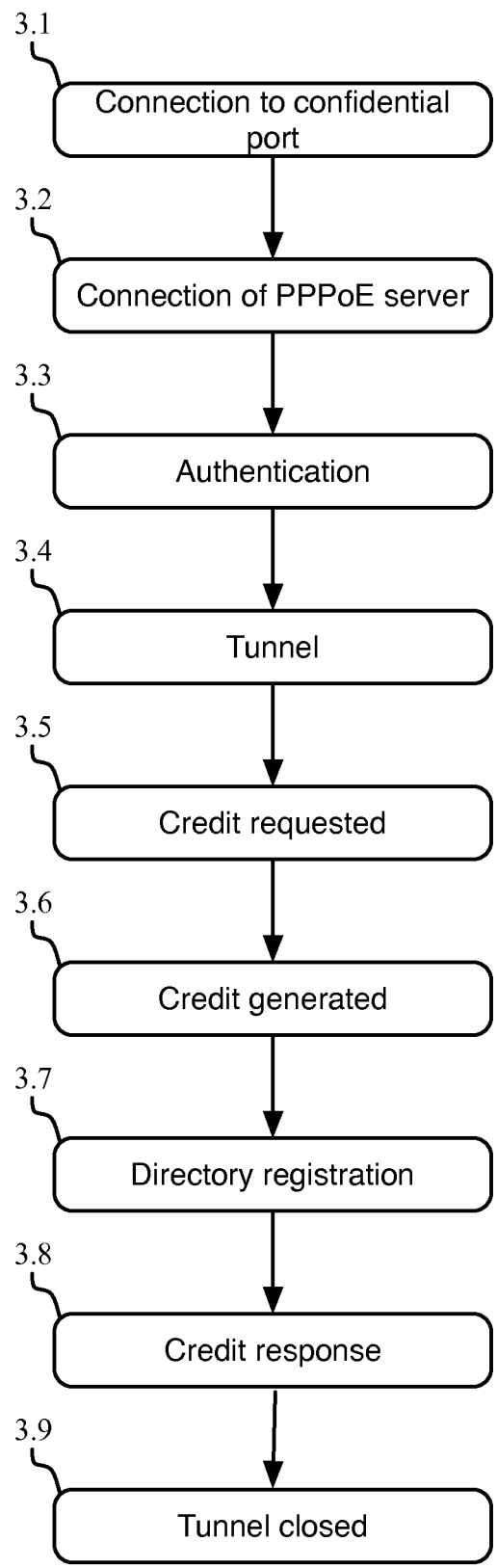
FIG. 3 illustrates in greater detail the process of connection to the configuration service according to the example of realising the invention.

FIG. 3 illustrates in more detail the process of connecting to the configuration service according to the example of realising the invention. During a first stage 3.1, the user connects the terminal to a confidential port. The terminal then initiates a connection to the PPPoE server to produce the tunnel during stage 3.2. To do this, it must be authenticated, stage 3.3. It then sends an authentication request to the PPPoE server with a connection credit, which is a secret shared between all the terminals and the PPPoE server. The authentication is therefore validated directly by the PPPoE server. When the authentication is successful, the tunnel is created during stage 3.4. The terminal is then connected to the configuration service via the tunnel. It then sends a request for a connection credit to the configuration server during stage 3.5. The server generates the credit, stage 3.6; in the example of realisation it generates a random password that it associates with the connection name consisting of the Ethernet network address for the terminal, known as the MAC address. During stage 3.7, the configuration server registers the credit thus generated within the directory. Any temporary readers associated will be initialised. The credit thus generated is sent to the terminal in the form of a response to a request, stage 3.8. Once the credit is stored by the terminal, the tunnel enters it and the configuration service is closed during stage 3.9.

Figure 4:
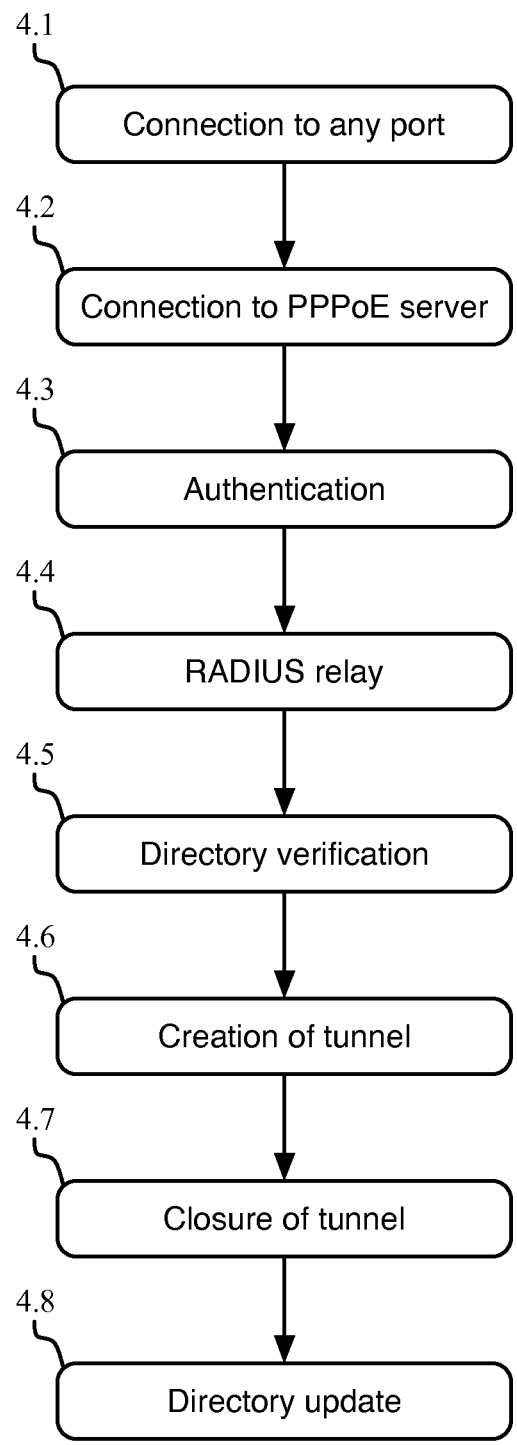
FIG. 4 illustrates the connection to the operational service of the terminal according to the example of realising the invention.

FIG. 4 illustrates the connection to the terminal operational service. During stage 4.1, the terminal is connected to any of the ports. This port may be a confidential port or free access port. During stage 4.2, the terminal is connected to the PPPoE server. It issues an authentication request using the connection credit received by it previously from the configuration service, stage 4.3. This request is relayed with the connection credit by the PPPoE server to the authentication server, in this case a Radius server, during stage 4.4. The Radius server then validates the credit and, using the directory, verifies any restrictions associated with the credit. For example, a period of validity may be entered in the directory; it is then verified that this period has not expired. This is stage 4.5. Advantageously, the connection is also entered in the directory using the associated timestamp. If the credit is recognised as being authentic and valid in the light of the associated restrictions, the Radius server validates the authentication. The tunnel can then be created (stage 4.6) between the terminal and the operational service. When the terminal no longer requires its connection, it initiates closure of the tunnel during stage 4.7. This closure is notified by the PPPoE server to the directory to indicate that the credit is no longer being used, during stage 4.8.

Advantageously, the connection credits issued are limited in time. In this case, the moment at which the connection credit is obtained is memorised in the directory, together with a period of validity. During the attempt to create the digital tunnel to the operational network, the switch control module verifies with the directory whether the current time is compatible with the moment of obtaining the credit plus the credit validity period. If connection is attempted outside the credit validity period, access is refused. It is thus possible to control the duration of access authorisations delivered and ensure that a user obtaining a connection credit cannot use that credit illegitimately at a later stage. One can also ensure that a person with evil intent cannot steal a connection credit and use it subsequently.

Advantageously, a limited number of attempts is authorised on a given connection port. When a terminal connects, it attempts to authenticate itself using a connection name and password. This authentication is verified with the authentication server. This server, in the example of realising the invention, is a Radius server. If the authentication fails, a failed attempt counter will be incremented within the directory. When the maximum number of attempts, usually 3, is reached, the switch control module shuts down the connection port and thus prohibits any connection from that port. Alternatively, the maximum number of unsuccessful connection attempts can be managed directly by the tunnel server, in this case the PPPoE server. This server then has the job of indicating any exceeding in the switch control module.

Advantageously, the switch control module only opens the free connection ports when a terminal is likely to make connection. A connection port is said to be free when no terminal is connected to it. To do this, it maintains a counter for connection credits issued and not used. When the system is initialised, all free access ports are closed. When a connection credit is issued to a terminal, the free access ports are then opened. As soon as the terminal has created the tunnel to the operational service, indicating consumption of the credit issued, all the free access ports other than the port being used by the terminal are then closed. Similarly, if more than one credit is issued, then as soon as all are consumed, the unused ports will be closed.

Advantageously, if one wishes to authorise roaming for a user, the connection ports are reopened when a user disconnects from a port and still has a valid connection credit, that is, the connection time associated with the connection credit has not expired. Advantageously, the same IP address is then assigned to the terminal to avoid the need to reinitialise the network connections.

Advantageously, the switch control module periodically monitors the periods of validity for unused connection credits. In this way, if a credit is issued and not used, it is possible to close the free access ports when this credit reaches its expiry date, if there are no other unconsumed credits issued.

Advantageously, each connection port has an associated time counter. This counter is initialised when a terminal makes a physical connection with the port. The counter thus allows limitation to a given period, usually 45 seconds in the example of realisation, the time available to the terminal to create the digital tunnel to the operational service or configuration service. After this time, the switch control module closes the connection port, making any connection impossible. Any malicious user therefore has only a limited time within which to attempt an attack on the system. Advantageously, the connection credits are managed on the terminal by a set of dedicated software tools. This set of tools is then downloaded by the terminal at the same time as the connection credit is downloaded when connection to the configuration service is made. This set of software tools may then be given different tasks. Advantageously, it is the set that then has the job of creating the digital tunnel to the operational service using the connection credit downloaded. It may have the responsibility for destroying the credit in certain circumstances. For example, it may monitor the validity of the connection credit and destroy a credit that is no longer valid, for example if its period of validity expires. It may also destroy the connection credit when the connection attempts counter reaches an authorised threshold, that is, after a given number of unsuccessful connection attempts. It may also destroy the connection credit when the time counter for creating the digital tunnel to the operational service indicates that the time limit has been reached without a successful connection attempt.

Advantageously, the set of software tools is deleted from the terminal after destruction of the connection credit with which it is associated.

Advantageously, the connection between each connection port and the switch is equipped with a device that allows physical interruption of the connection, known as an e-breaker. This system allows physical severance of the Ethernet link between the switch and the equipment motherboard. Once activated, the switch ports remain in their current state, but no further Ethernet frame can join the system. These e-breakers are then controlled by the switch control module. They allow this module to close the connection ports physically so as to prohibit physically any attempt at connection when the port is closed.

The invention claimed is:

1. Procedure for accessing a data network via a terminal, by creating a tunnel from said terminal to an operational service, using a connection credit, said procedure comprising:
    A stage (2.1) of connecting the terminal to a port of said data network,
    A stage (2.2) of creating a tunnel to a configuration service,
    A stage (2.3) of obtaining a connection credit from the said configuration service,
    A stage (2.6) of creating a tunnel to said operational service in order to access this service using the connection credit obtained from the configuration service,
    wherein in step (2.1), said terminal is connected to a physical dedicated network connection port (12), called a confidential port, said confidential port (12) being the sole physical port amongst a plurality of physical ports (13) of said data network dedicated to authorize the access of the connected terminal to said configuration service by using the tunnel created in step (2.2) in contrast to the other ports (13) of said plurality of physical ports which do not authorize said access.

2. Procedure for accessing a data network as per claim 1, wherein the connection credits issued by the configuration service are limited in time, the stage of creating a tunnel to the operational service includes a stage of verifying the validity of the credit.

3. Procedure for accessing a data network according to claim 1, wherein it also comprises a stage of closing the port to which the terminal is connected when a given number of unsuccessful attempts during the creation of a tunnel to the service is operational.

4. Procedure for accessing a data network according to claim 1, wherein it also comprises:
    A stage of opening free connection ports when a connection credit is issued by the configuration service;
    A stage of closing the free connection ports when no unused connection credit is available.

5. Procedure for accessing a data network according to claim 4, wherein it also comprises a stage of opening the free connection ports when a terminal disconnects from a port while it has a connection credit that is still valid.

6. Procedure for accessing a data network according to claim 4, wherein it also comprises:
    A stage of periodic surveillance of the periods of validity of the unused connection credits;
    A stage of closure of free connection ports when all the unused connection credits cease to be valid.

7. Procedure for accessing a data network according to claim 1, wherein it also comprises a stage of closing the port to which the terminal is connected if a tunnel to one of the services is not established within a given time.

8. Procedure for accessing a data network according to claim 1, wherein it comprises a stage of obtaining a set of software tools from the configuration service, the stage of creating the tunnel to the operational service then being managed by the said set of software tools.

9. Procedure for accessing a data network according to claim 8, wherein it also comprises:
    A stage of periodic surveillance of the validity of the connection credit, by the set of software tools;
    A stage of deletion of the connection credit and the set of software tools, when this connection credit is no longer valid.

10. Procedure for accessing a data network according to claim 1, wherein the stages of closing the connection port comprise a stage of physical closure of the said port using a device that allows physical interruption of the connection to the connection port.

11. Data network comprising means for a terminal to access an operational service, using a connection credit, said data network furthermore comprising:
    A set of physical network connection ports (12, 13) for a terminal to connect to said data network;
    Means of creating a first tunnel from a terminal connected to a connection port to a configuration service, in order for said terminal to access the configuration service and to obtain a connection credit;
    Means of creating a second tunnel from a terminal connected to a connection port to said operational service in order for said terminal to access said operational service using the connection credit obtained from the configuration service;

wherein said data network comprises at least one dedicated physical port, called a confidential port, said confidential port(s) (12) being the sole physical port(s) amongst a plurality of physical ports (13) of said data network dedicated to authorize the access of the connected terminal to said configuration service whereas the other ports (13) of said plurality of physical ports do not authorize said access to the configuration service.

\* \* \* \* \*